(12) United States Patent
Clinger

(10) Patent No.: US 10,557,735 B2
(45) Date of Patent: Feb. 11, 2020

(54) COMPACT FLOWMETER WITH NOVEL FLOW TUBE CONFIGURATION AND RELATED METHOD

(71) Applicant: Micro Motion, Inc., Boulder, CO (US)

(72) Inventor: Asher James Clinger, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 60 days.

(21) Appl. No.: 15/777,442

(22) PCT Filed: Dec. 18, 2015

(86) PCT No.: PCT/US2015/066685
§ 371 (c)(1),
(2) Date: May 18, 2018

(87) PCT Pub. No.: WO2017/105493
PCT Pub. Date: Jun. 22, 2017

(65) Prior Publication Data
US 2018/0335331 A1    Nov. 22, 2018

(51) Int. Cl.
*G01F 1/84* (2006.01)

(52) U.S. Cl.
CPC .......... *G01F 1/8409* (2013.01); *G01F 1/8404* (2013.01); *G01F 1/845* (2013.01)

(58) Field of Classification Search
None
See application file for complete search history.

(56) References Cited

U.S. PATENT DOCUMENTS 8,590,400 B2    11/2013 Keita et al.
2015/0082916 A1*  3/2015 Sukemura ............ G01F 1/8495
                                                      73/861.357

FOREIGN PATENT DOCUMENTS

EP          2843375 A1    3/2015
JP          H11230804 A   8/1999

* cited by examiner

*Primary Examiner* — Harshad R Patel
(74) *Attorney, Agent, or Firm* — The Ollila Law Group LLC

(57) ABSTRACT

A flowmeter (5) is provided having a sensor assembly (10) connected to meter electronics (20), wherein the sensor assembly (10) comprises at least one driver (104), at least one pickoff (105), and a first D-shaped conduit (400A) configured to receive a process fluid therein, as well as a second D-shaped conduit (400B) configured to receive a process fluid therein.

9 Claims, 5 Drawing Sheets

COMPACT FLOWMETER WITH NOVEL FLOW TUBE CONFIGURATION AND RELATED METHOD

TECHNICAL FIELD

The present invention relates to flowmeters, and more particularly to a compact flowmeter and related methods.

BACKGROUND OF THE INVENTION

Vibrating sensors, such as for example, vibrating densitometers and Coriolis flowmeters are generally known, and are used to measure mass flow and other information related to materials flowing through a conduit in the flowmeter. Exemplary Coriolis flowmeters are disclosed in U.S. Pat. Nos. 4,109,524, 4,491,025, and Re. 31,450. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or with a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet end leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

Prior art flowmeters typically utilize two conduits, each having circular cross-sectional areas. In order to maintain optimal flow rates through the conduits, the conduits must have a particular diameter. However, when the conduits are placed next to each other, the combined width of the two tubes is greater than the width of the inlet pipe. This causes the meter to be wider than the pipeline.

Therefore, there is a need in the art for a method and related apparatus to reduce the profile of a flowmeter. There is a need for a method and related apparatus to maintain a minimum fluid velocity such that accurate flow measurements may be acquired for a wide range of flow rates in a flowmeter, yet still be compact. The present invention overcomes these and other problems by providing a method and related apparatus for a flowmeter having conduits with a D-shaped cross-section that are placed closer together than is possible for conduits having a circular cross-section, thus an advance in the art is achieved.

SUMMARY OF THE INVENTION

A flowmeter having a sensor assembly connected to meter electronics is provided according to an embodiment. The sensor assembly comprises at least one driver and at least one pickoff. The sensor assembly comprises a first D-shaped conduit configured to receive a process fluid therein, and a second D-shaped conduit configured to receive a process fluid therein.

Flow conduits for a flowmeter sensor assembly are provided according to an embodiment. The flow conduits comprise a first D-shaped conduit configured to receive a process fluid therein, and a second D-shaped conduit configured to receive a process fluid therein.

A method of forming a flowmeter is provided according to an embodiment. The method comprises the step of providing a sensor assembly comprising conduits and at least one driver and at least one pickoff attached to the conduits. The conduits comprise a first D-shaped conduit configured to receive a process fluid therein, and a second D-shaped conduit configured to receive a process fluid therein.

ASPECTS

According to an aspect, a flowmeter having a sensor assembly connected to meter electronics, wherein the sensor assembly comprises at least one driver and at least one pickoff, comprising: a first D-shaped conduit configured to receive a process fluid therein; and a second D-shaped conduit configured to receive a process fluid therein.

Preferably, flat portions of each D-shaped conduit are positioned proximate and substantially parallel to each other.

Preferably, a combined width of the first and second D-shaped conduits is less than or equal to a width of an inlet pipe.

Preferably, the combined width of the first and second D-shaped conduits in addition to a space therebetween, is less than or equal to the width of the inlet pipe.

Preferably, a β value of the D-shaped conduits is approximately 0.8.

According to an aspect, flow conduits for a flowmeter sensor assembly comprise a first D-shaped conduit configured to receive a process fluid therein, and a second D-shaped conduit configured to receive a process fluid therein.

Preferably, flat portions of each D-shaped conduit are positioned proximate and substantially parallel to each other.

Preferably, the flow conduits are configured to have a combined width of the first and second D-shaped conduits that is less than or equal to a width of an inlet pipe configured to be in fluid communication therewith.

Preferably, the flow conduits are configured to have a combined width of the first and second D-shaped conduits in addition to a space therebetween, that is less than or equal to a width of an inlet pipe configured to be in fluid communication therewith.

Preferably, a β value of the D-shaped conduits is approximately 0.8.

According to an aspect, a method of forming a flowmeter comprises the step of:

providing a sensor assembly comprising conduits and at least one driver and at least one pickoff attached to the conduits, wherein the conduits comprise: a first D-shaped conduit configured to receive a process fluid therein; and a second D-shaped conduit configured to receive a process fluid therein.

Preferably, the method comprises the steps of: providing flat portions of each D-shaped conduit; and positioning the flat portions of each D-shaped conduit proximate and substantially parallel to each other.

Preferably, the method comprises the step of forming the first and second D-shaped conduits such that their combined width is less than or equal to a width of an inlet pipe.

Preferably, the method comprises the step of forming the first and second D-shaped conduits such that their combined width, including a space therebetween, is less than or equal to the width of the inlet pipe.

Preferably, a β value of the D-shaped conduits is approximately 0.8.

DETAILED DESCRIPTION OF THE INVENTION

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
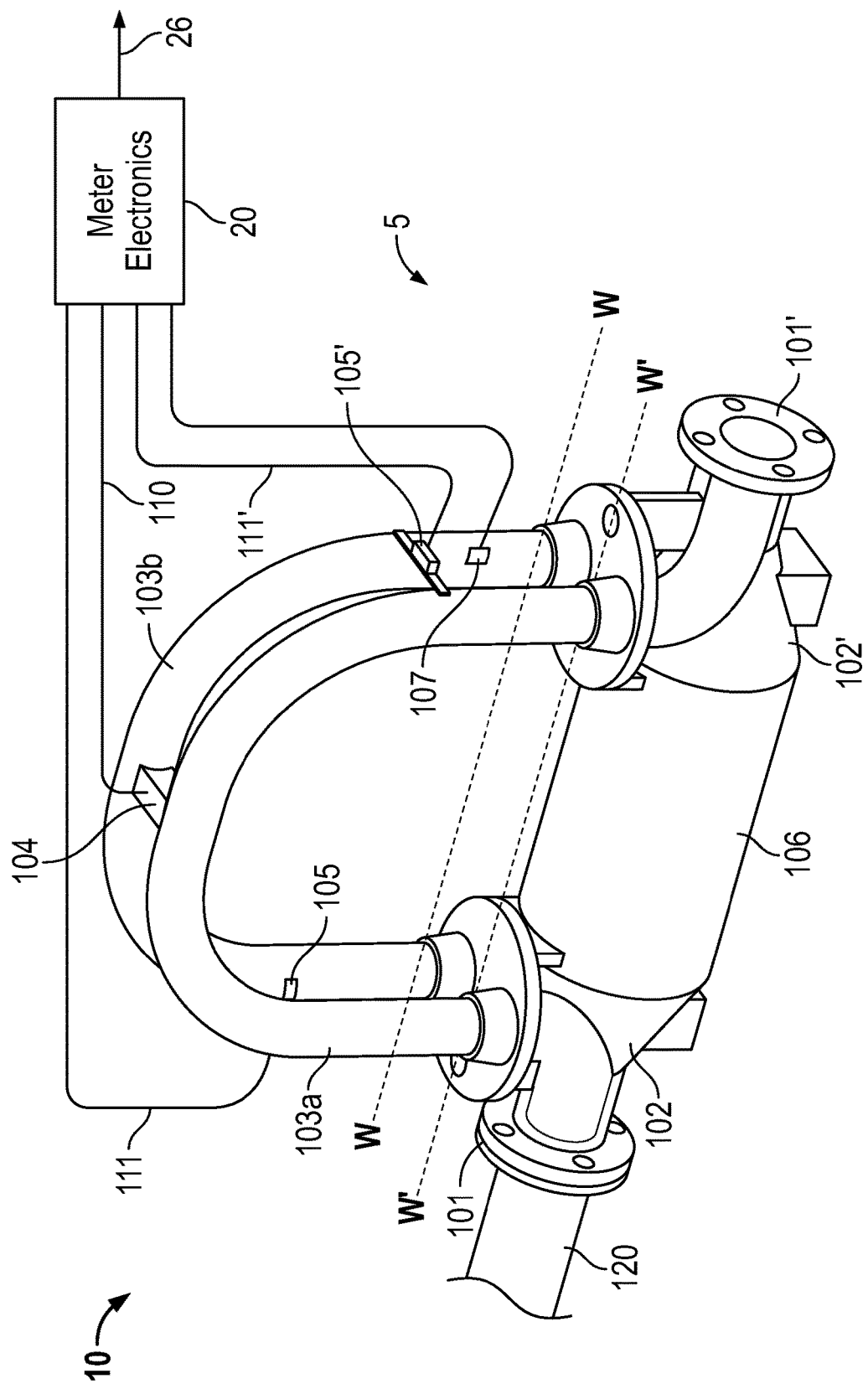
FIG. 1 shows a prior art vibrating sensor assembly.

FIG. 1 illustrates an example of a prior art flowmeter 5 in the form of a Coriolis flowmeter comprising a sensor assembly 10 and one or more meter electronics 20. The one or more meter electronics 20 are connected to the sensor assembly 10 to measure a characteristic of a flowing material, such as, for example, density, pressure, mass flow rate, volume flow rate, totalized mass flow, temperature, and other information.

The sensor assembly 10 includes a pair of flanges 101 and 101', manifolds 102 and 102', and conduits 103A and 103B. Manifolds 102, 102' are affixed to opposing ends of the conduits 103A, 103B. The manifolds 102, 102' are typically multi-piece assemblies. Flanges 101 and 101' of the present example are affixed to manifolds 102 and 102'. Manifolds 102 and 102' of the present example are affixed to opposite ends of spacer 106. The spacer 106 maintains the spacing between manifolds 102 and 102' in the present example to prevent undesired vibrations in conduits 103A and 103B. The conduits 103A and 103B extend outwardly from the manifolds 102 and 102' in a parallel fashion. When the sensor assembly 10 is inserted into a pipeline system which carries the process material, the material enters sensor assembly 10 via an inlet pipe 120 through flange 101, passes through inlet manifold 102 where the total amount of material is directed to enter conduits 103A and 103B, flows through conduits 103A and 103B and back into outlet manifold 102' where it exits the sensor assembly 10 through the flange 101'.

The sensor assembly 10 includes a driver 104. The driver 104 is affixed to conduits 103A and 103B in a position where the driver 104 can vibrate the conduits 103A, 103B in the drive mode. More particularly, the driver 104 includes a first driver component (not shown) affixed to conduit 103A and a second driver component (not shown) affixed to conduit 103B. The driver 104 may comprise one of many well-known arrangements, such as a magnet mounted to the conduit 103A and an opposing coil mounted to the conduit 103B.

In the present example, the drive mode may be the first out of phase bending mode and the conduits 103A and 103B would be selected and appropriately mounted to inlet manifold 102 and outlet manifold 102' so as to provide a balanced system having substantially the same mass distribution, moments of inertia, and elastic moduli about bending axes W-W and W'-W', respectively. In the present example, where the drive mode is the first out of phase bending mode, the conduits 103A and 103B are driven by the driver 104 in opposite directions about their respective bending axes W-W and W'-W'. A drive signal in the form of an alternating current can be provided by one or more meter electronics 20, such as for example via lead 110, and passed through the coil to cause both conduits 103A, 103B to oscillate.

The sensor assembly 10 shown includes a pair of pickoffs 105, 105' that are affixed to conduits 103A, 103B. More particularly, a first pickoff component (not shown) is located on conduit 103A and a second pickoff component (not shown) is located on conduit 103B. In the embodiment depicted, the pickoffs 105, 105' may be electromagnetic detectors, for example—pickoff magnets and pickoff coils that produce pickoff signals that represent the velocity and position of the conduits 103A, 103B. For example, the pickoffs 105, 105' may supply pickoff signals to the one or more meter electronics via pathways 111, 111'. Those of ordinary skill in the art will appreciate that the motion of the conduits 103A, 103B is proportional to certain characteristics of the flowing material, for example, the mass flow rate and density of the material flowing through the conduits 103A, 103B.

In the prior art example shown in FIG. 1, the one or more meter electronics 20 receive the pickoff signals from the pickoffs 105, 105'. Path 26 provides an input and an output means that allows one or more meter electronics 20 to interface with an operator. The one or more meter electronics 20 measure a characteristic of a flowing material, such as, for example, a phase difference, a frequency, a time delay, a density, a mass flow rate, a volume flow rate, a totalized mass flow, a temperature, a meter verification, pressure, and other information. More particularly, the one or more meter electronics 20 receive one or more signals, for example, from pickoffs 105, 105' and one or more temperature sensors 107, such as a resistive temperature detector (RTD), and use this information to measure a characteristic of a flowing material.

Current Design Practice for flowmeters is to have a "beta ratio" of about 0.8. The beta ratio (also referred to as area ratio) refers to the ratio between the cross-sectional area of the conduits 103A, 103B and the cross-sectional area of the inlet pipe 120. The beta ratio, β, may be determined as follows:

$$\beta = \frac{a}{A} \quad (1)$$

Where:
β=beta ratio;
A=cross-sectional area of inlet pipe; and
a=cross-sectional area of conduit.

For a β of 0.8, for example without limitation, a given cross-sectional area of a conduit should be 80% of the cross-sectional area of the inlet pipe. This increases the velocity of the fluid in the pipe and makes the flowmeter 5 more sensitive. A β of 0.8 is merely an example, and other values greater or less than 0.8 are also contemplated.

For a given maximum flow rate, a predetermined minimum cross-sectional area of the conduits is needed for optimal flowmeter performance. A single conduit would allow the minimum meter width, but flowmeters 5 having only a single conduit are unbalanced, and have had less success in the industry. Dual tube meters are used to create balance in the flowmeter. However, placing two round conduits adjacent to each other forces the dimensions of the flowmeter to be larger than that of a single conduit meter, even if the dual conduits are smaller. This is exemplified by FIG. 2.

Figure 2A:
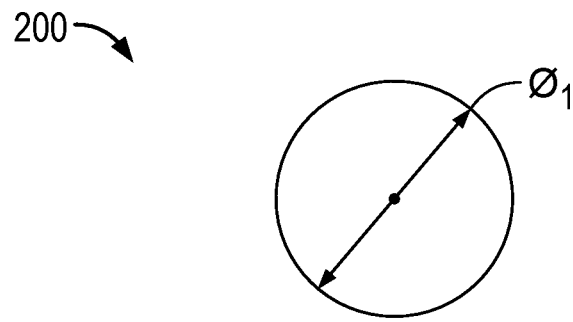
FIG. 2A illustrates a cross-sectional profile of a prior art inlet pipe.
Figure 2B:
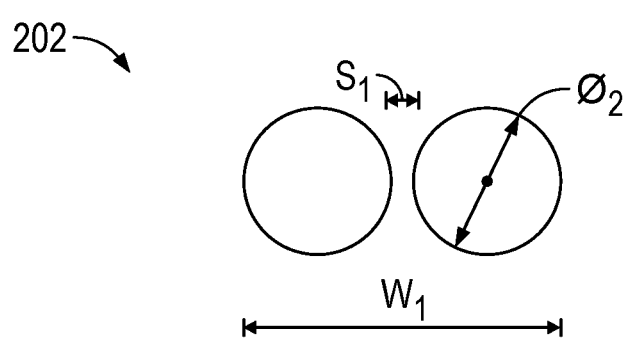
FIG. 2B illustrates a cross-sectional profile of prior art flow conduits.
Figure 2C:
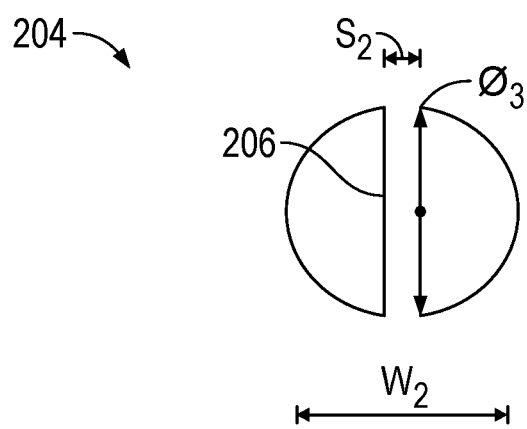
FIG. 2C illustrates a cross-sectional profile of flow conduits according to an embodiment.

FIGS. 2A-2C illustrate three cross-sections of flow channels for a flowmeter 5. FIG. 2A illustrates a cross-sectional profile of a prior art circular inlet pipe 200 having an inner diameter $Ø_1$. FIG. 2B illustrates a cross-sectional profile 202 of prior art flow conduits with circular cross section (e.g. of conduits 103A, 103B). The circular conduits each have an inner diameter $Ø_2$. FIG. 2C illustrates a cross-sectional profile 204 of flow conduits according to an embodiment. The conduits according to the embodiment may be D-shaped conduits 400A, 400B (see FIGS. 4-6). The D-shaped conduits 400A, 400B have a cross-section $Ø_3$ measured along flat portion 206. To illustrate the benefit of the D-shaped conduits 400A, 400B, hypothetical values will be applied to the cross-sections 200, 202, 204:

Assume for this example that $Ø_1$ for the inlet pipe is 1.0", $Ø_2$ for a standard dual-tube conduit setup are each 0.632", and $Ø_3$ for the D-shaped conduits 400A, 400B according to an embodiment are each 0.894". Therefore, according to equation (1) for the standard dual tube cross-sections 202, a=0.63 and A=0.78, so β=0.8. For the D-shaped conduit cross-sections 204, a=0.63 and A=0.78, so β=0.8. It will be clear that the β value for both the standard dual conduits and the D-shaped conduits are the same. Now consider that the spacing between the standard dual conduits, $S_1$, and the spacing between the D-shaped conduits, $S_2$, are equal. In this example let $S_1$ and $S_2$ equal 0.106". Therefore, the total width, $W_1$, of the standard dual conduits would be 1.37", which is 0.37" larger than the inlet pipe 120. Advantageously, the total width, $W_2$, of the D-shaped conduits is 1.0", which is the same width of the inlet pipe 120. This equates roughly to a 27% decrease in potential flowmeter thickness. In reality, a flowmeter having conduits with D-shaped cross-sections could have the conduits placed close enough together to give the compactness of a single tube flowmeter without sacrificing the balance of a dual tube flowmeter.

Figure 3:
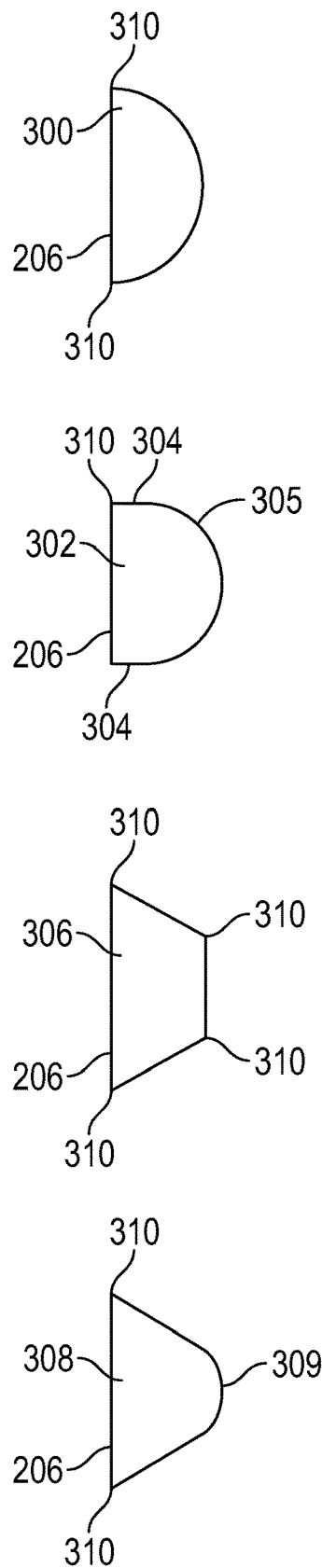
FIG. 3 illustrates cross-sectional profiles according to embodiments.

Turning to FIG. 3, it should be appreciated that the D-shape of the flow tube may have some variation in cross-sectional shape in different embodiments. For example, a strict half-circle 300 is contemplated. However, a D-shape 302 having a flat major edge 206 with two substantially perpendicular minor edges 304 that are connected with a curved portion 305—like a traditional letter "D"—is also contemplated. A trapezium-shaped quadrilateral is also contemplated 306. A trapezium-shaped cross-section 308 having a curve 309 is also contemplated. In any embodiment, corners 310 may be an angle, a right angle, a radius, a chamfer, etc. Combinations of corner 310 profiles are also contemplated within a single cross-sectional shape.

Figure 4:
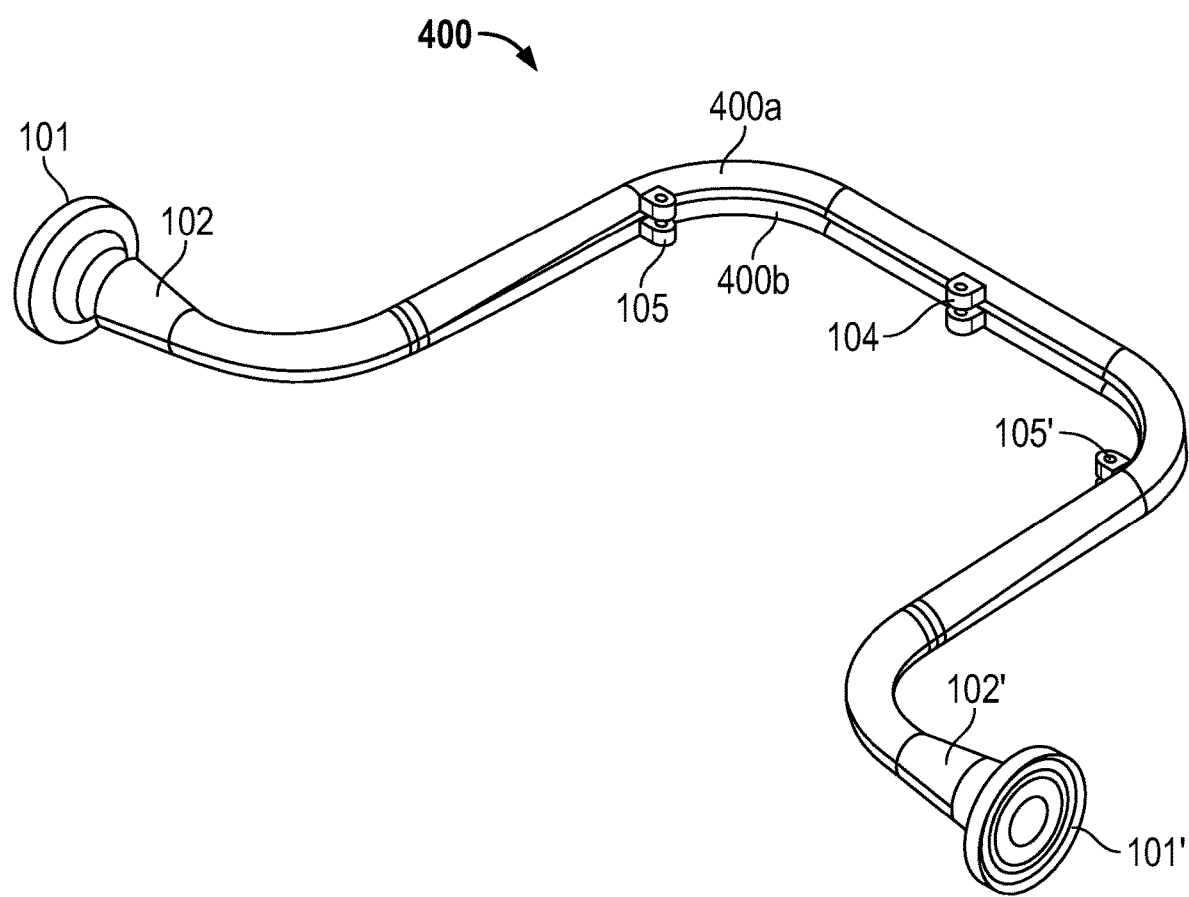
FIG. 4 shows an isometric view of conduits according to an embodiment.
Figure 5:
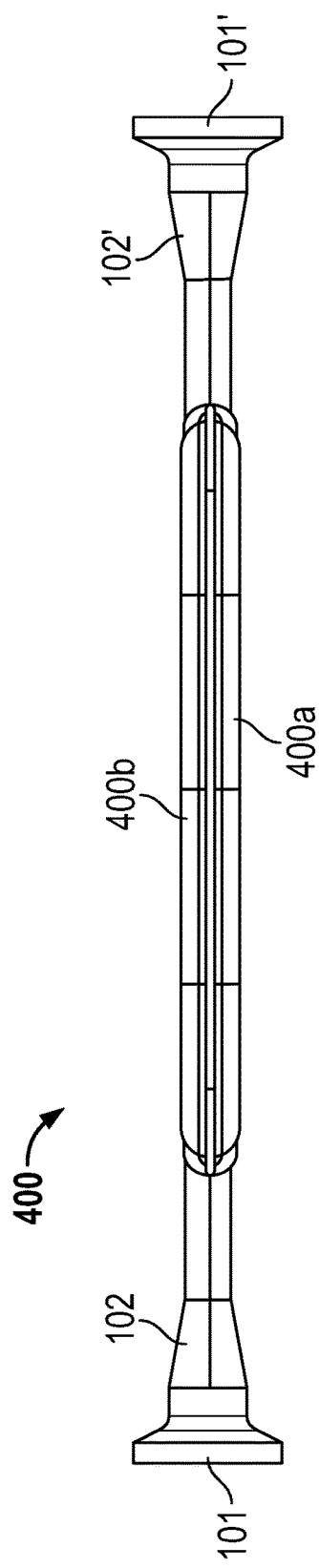
FIG. 5 shows a top view of the conduits of FIG. 4.
Figure 6:
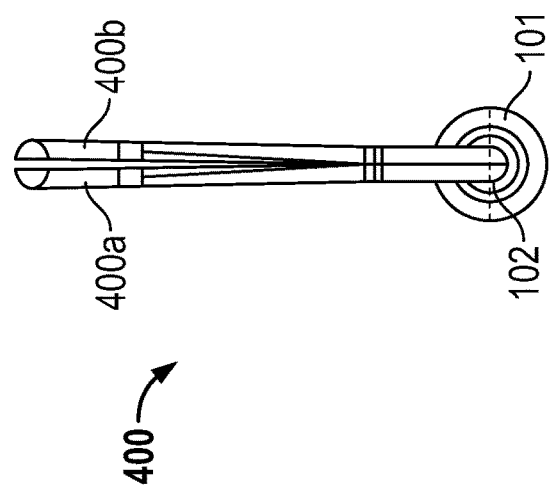
FIG. 6 shows a side cutaway view of the conduits of FIGS. 4 and 5.

FIGS. 4-6 illustrate D-shaped conduits 400 according to an embodiment. In a flowmeter 5, these D-shaped conduits 400 (first conduit 400A, and second conduit 400B) would replace the round conduits 103A, 103B of prior art flowmeters, such as that illustrated in FIG. 1. Although the figures illustrate bent D-shaped conduits 400, straight D-shaped conduits 400 are also contemplated. FIG. 4 is an isomeric view, FIG. 5 is a top view, and FIG. 6 is a back cutaway view of the D-shaped conduits 400. In order to minimize the profile of the flowmeter 5, the width, $W_2$, of a pair of D-shaped conduits 400 is minimized by placing the flat portions 206 of each D-shaped conduit 400A, 400B adjacent to each other such that the flat portions 206 are substantially parallel to each other, as illustrated in FIGS. 2 and 4-6.

The present invention as described above provides various systems and methods related to variably modulated flow conduits. Although the various embodiments described above are directed towards flowmeters, specifically Coriolis flowmeters, it should be appreciated that the present invention should not be limited to Coriolis flowmeters, but rather the methods described herein may be utilized with other types of flowmeters, or other vibrating sensors that lack some of the measurement capabilities of Coriolis flowmeters.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating sensors, and not just to the embodiments described above and shown in the accompanying figures.

Accordingly, the scope of the invention should be determined from the following claims.

What is claimed is:

1. A flowmeter (5) having a sensor assembly (10) connected to meter electronics (20), wherein the sensor assembly (10) comprises at least one driver (104) and at least one pickoff (105), comprising:
    a first D-shaped conduit (400A) configured to receive a process fluid therein; and
    a second D-shaped conduit (400B) configured to receive a process fluid therein;
    wherein the combined width of the first and second D-shaped conduits (400A, 400B) in addition to a space therebetween (S2), is less than a width of an inlet pipe (120).

2. The flowmeter (5) of claim 1, wherein flat portions (206) of each D-shaped conduit (400A, 400B) are positioned proximate and substantially parallel to each other.

3. The flowmeter (5) of claim 1, wherein a β value of the D-shaped conduits (400A, 400B) is approximately 0.8.

4. Flow conduits (400) for a flowmeter (5) sensor assembly (10) comprising:
    a first D-shaped conduit (400A) configured to receive a process fluid therein; and
    a second D-shaped conduit (400B) configured to receive a process fluid therein,
    wherein the flow conduits (400) are configured to have a combined width of the first and second D-shaped conduits (400A, 400B) in addition to a space therebetween ($S_2$), that is less than a width of an inlet pipe (120) configured to be in fluid communication therewith.

5. The flow conduits (400) of claim 4, wherein flat portions (206) of each D-shaped conduit (400A, 400B) are positioned proximate and substantially parallel to each other.

6. The flowmeter (5) of claim 4, wherein a β value of the D-shaped conduits (400A, 400B) is approximately 0.8.

7. A method of forming a flowmeter comprising the step of: providing a sensor assembly comprising conduits and at least one driver and at least one pickoff attached to the conduits, wherein the conduits comprise:
    a first D-shaped conduit configured to receive a process fluid therein; and
    a second D-shaped conduit configured to receive a process fluid therein;
    forming the first and second D-shaped conduits such that their combined width, including a space therebetween, is less than a width of an inlet pipe.

8. The method of claim 7, comprising the steps of:
    providing flat portions of each D-shaped conduit; and
    positioning the flat portions of each D-shaped conduit proximate and substantially parallel to each other.

9. The method of claim 8, comprising the step of forming the first and second D-shaped conduits such that a β value of the D-shaped conduits is approximately 0.8.

* * * * *

UNITED STATES PATENT AND TRADEMARK OFFICE
CERTIFICATE OF CORRECTION

PATENT NO. : 10,557,735 B2
APPLICATION NO. : 15/777442
DATED : February 11, 2020
INVENTOR(S) : Asher James Clinger It is certified that error appears in the above-identified patent and that said Letters Patent is hereby corrected as shown below:

In the Claims

Column 8, Line 25, replace "9. The method of claim 8," with --9. The method of claim 7,--

Signed and Sealed this
Twenty-third Day of June, 2020

Andrei Iancu
*Director of the United States Patent and Trademark Office*